US012151351B2

(12) United States Patent
Lübkert et al.

(10) Patent No.: US 12,151,351 B2
(45) Date of Patent: Nov. 26, 2024

(54) ELECTROPNEUMATIC IMPACT MECHANISM

(71) Applicant: Hilti Aktiengesellschaft, Schaan (LI)

(72) Inventors: Ernst-Rudolf Lübkert, Landsberg am Lech (DE); Uto Plank, Freising (DE); Karin Groth, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 70 days.

(21) Appl. No.: 18/009,522

(22) PCT Filed: Jun. 15, 2021

(86) PCT No.: PCT/EP2021/066032
§ 371 (c)(1),
(2) Date: Dec. 9, 2022

(87) PCT Pub. No.: WO2022/002575
PCT Pub. Date: Jan. 6, 2022

(65) Prior Publication Data

US 2023/0311288 A1 Oct. 5, 2023

(30) Foreign Application Priority Data

Jun. 29, 2020 (EP) .................................... 20182763

(51) Int. Cl.
*B25D 11/12* (2006.01)
*B25D 17/06* (2006.01)

(52) U.S. Cl.
CPC .............. *B25D 11/12* (2013.01); *B25D 17/06* (2013.01); *B25D 2222/06* (2013.01); *B25D 2222/54* (2013.01); *B25D 2250/331* (2013.01)

(58) Field of Classification Search
CPC .... B25D 17/06; B25D 11/12; B25D 2222/06; B25D 2222/54; B25D 2250/331; B25D 2211/068
See application file for complete search history.

(56) References Cited

U.S. PATENT DOCUMENTS 5,735,174 A * 4/1998 Enomoto .............. F16C 33/201
74/89.32
2019/0308307 A1* 10/2019 Young .................... B25D 17/24

FOREIGN PATENT DOCUMENTS

DE 2605998 A1 8/1977
DE 2743153 A1 4/1979
(Continued)

OTHER PUBLICATIONS

International Search Report of PCT/EP2021/066032 dated Aug. 3, 2021.

*Primary Examiner* — Thomas M Wittenschlaeger
(74) *Attorney, Agent, or Firm* — Davidson Kappel LLC

(57) ABSTRACT

An electropneumatic impact mechanism for an electric hand-held power tool, in particular a hammer drill and/or chipping hammer, wherein the impact mechanism has a transmission housing, a guide tube arranged at least partially in the transmission housing, an exciter piston that is movable in the axial direction in the guide tube, a connecting rod coupled to the exciter piston, and an eccentric wheel which is coupled to the connecting rod on one side and is mounted so as to be rotatable with respect to the transmission housing on the other side, wherein the impact mechanism has a bearing body on which the eccentric wheel is mounted rotatably by means of a pair of plain bearings.

19 Claims, 4 Drawing Sheets

(56) References Cited

FOREIGN PATENT DOCUMENTS

| | | | | |
|---|---|---|---|---|
| DE | 10009705 | A1 * | 8/2001 | ............. B25C 11/00 |
| DE | 102004046627 | A1 | 3/2006 | |
| GB | 2418635 | B | 11/2006 | |

* cited by examiner

ELECTROPNEUMATIC IMPACT MECHANISM

The present invention relates to an electropneumatic impact mechanism for an electric hand-held power tool, in particular a hammer drill and/or chipping hammer. The impact mechanism is provided with a transmission housing, a guide tube arranged at least partially in the transmission housing, an exciter piston that is movable in the guide tube, a connecting rod coupled to the exciter piston, and with an eccentric wheel. The eccentric wheel is coupled to the connecting rod on one side and is mounted so as to be rotatable with respect to the transmission housing on the other side.

BACKGROUND

Impact mechanisms of the type mentioned at the beginning and hand-held power tools with such impact mechanisms are basically known from the prior art.

SUMMARY OF THE INVENTION

It is an object of the present invention to provide an impact mechanism which can be mounted and removed comparatively simply and therefore cost-effectively.

The present invention provides that the impact mechanism has a bearing body on which the eccentric wheel is mounted rotatably by means of a pair of plain bearings. This has the advantage that comparatively complicated mountings of the eccentric wheel that include ball bearings, needle bearings or the like can be dispensed with and therefore fewer parts have to be fitted.

In a particularly preferred refinement, the bearing shaft is composed of plastic or comprises such a plastic. It has been found to be advantageous if the bearing shaft is consists of carbon fiber-reinforced plastic or comprises such carbon fiber-reinforced plastic. The plastic can comprise one or more of the base polymers polyketone (PK), polyamides (PA), polybutylene terephthalate (PBT), polyphthalamides (PPA), polyphenylene sulfide (PPS) and/or polyether ether ketone (PEEK). The plastic can have one or more additives for improving the sliding properties (in particular in the event of a lack of lubrication and dry operation), in particular molybdenum disulfide, polytetrafluoroethylene (PTFE) and/or graphite. The invention includes in this respect the finding that a bearing shaft which is composed of plastic or comprises such a plastic is significantly lighter than steel bearing shafts known from the prior art.

In a further preferred refinement, the bearing body is configured as a bearing shaft which is different from the eccentric wheel. It has been found to be advantageous if the eccentric wheel has a central bore which is paired with the bearing shaft via a clearance fit, and the pair of plain bearings is thus formed. The bearing shaft can accordingly provide a radial running surface for the eccentric wheel.

In a further preferred refinement, the bearing shaft has a collar which provides an axial sliding surface for the eccentric wheel. It has been found to be advantageous if the bearing shaft is secured by its collar in a form-fitting manner against rotating relative to the transmission housing. The collar can have a waved revolving toothing which provides a form fit, with respect to the revolving direction of the bearing shaft, with a corresponding toothing in the end plate of the transmission housing. In a particularly preferred refinement, the eccentric wheel is directly in contact with the collar. Alternatively or additionally, the eccentric wheel is secured by the collar in the axial direction against lifting off from the connecting rod.

In a particularly preferred refinement, the bearing shaft is paired with the transmission housing via a clearance fit on a side of the collar facing the eccentric wheel. Alternatively or additionally, the bearing shaft can be secured by a screw connection in the axial direction in the transmission housing on a side of the collar facing the eccentric wheel.

As an alternative to a refinement of the bearing body as a bearing shaft, the bearing body can be configured as a bearing journal and/or integrally with the transmission housing. It has been found to be advantageous if the pair of plain bearings has a plain bearing bushing arranged between the eccentric wheel and the bearing journal. It has likewise been found to be advantageous if the plain bearing bushing is pressed into the eccentric wheel. In a particularly preferred refinement, the bearing journal has a draft which corresponds to a draft of the plain bearing bushing. In order to improve the sliding properties between end plate and eccentric wheel, a sliding coating, for example a PTFE sliding coating, can be provided between the end plate and the eccentric wheel.

In all previously described exemplary embodiments, the transmission housing can have a closure cover which, on a side facing the eccentric wheel, has at least one retaining lip. It has been found to be advantageous if a profile of the retaining lip at least partially, preferably completely, follows a circular path of an eccentric point of the eccentric wheel. A plurality of retaining lips, each configured concentrically with respect to one another, can be provided. The retaining lips can differ in diameter from one another. In this way, the connecting rod and the eccentric wheel are preferably secured against lifting off in the axial direction.

In all previously described exemplary embodiments, the eccentric wheel can preferably be configured as an externally toothed gear wheel which can be rotationally driven preferably via an electric motor incorporated by a hand-held power tool.

The present invention also provides an electric hand-held power tool, in particular a hammer drill and/or chipping hammer, which is provided with an impact mechanism of the above-described type.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the drawings.

DETAILED DESCRIPTION

Figure 1A:
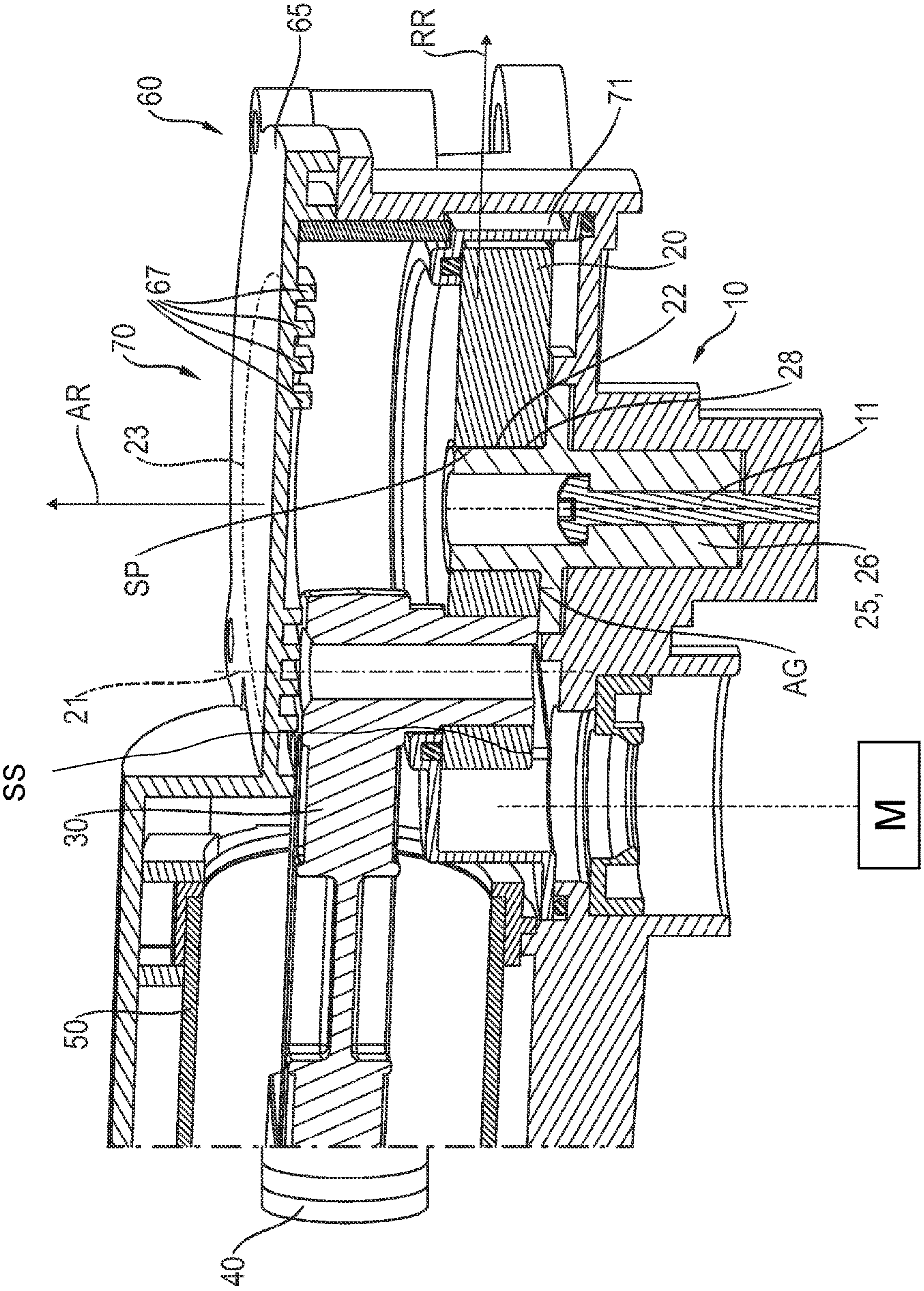
FIGS. 1A, 1B and 1C show a first exemplary embodiment of an impact mechanism according to the invention.
Figure 1B:
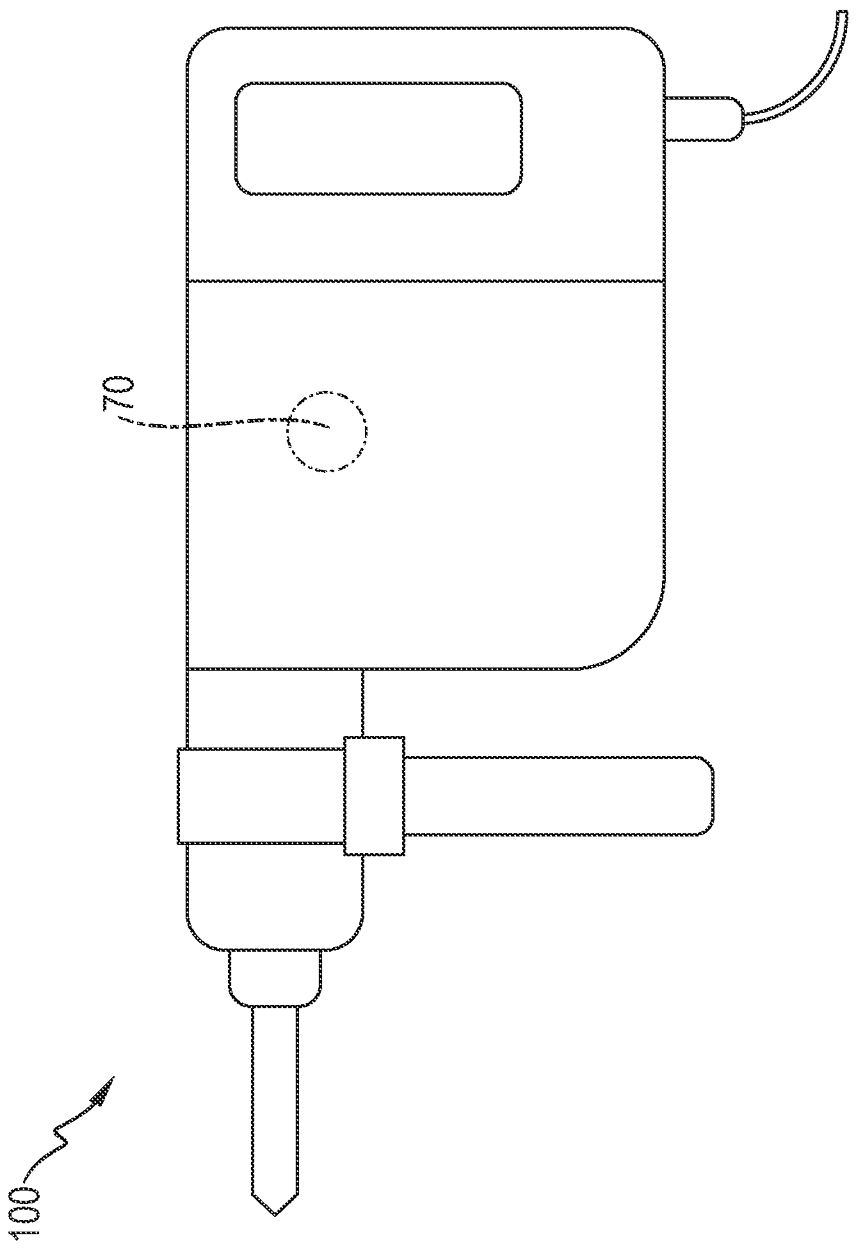

A first preferred exemplary embodiment of an electropneumatic impact mechanism 70 of an electric hand-held power tool 100 (cf. FIG. 1B, for example in the form of a chipping hammer) is illustrated in FIG. 1A.

The electropneumatic impact mechanism 70 has a transmission housing 60 and a guide tube 50, wherein the guide tube 50 is arranged at least partially in the transmission housing 60. The electropneumatic impact mechanism 70 also has an exciter piston 40 that is movable in the guide tube 50, a connecting rod 30 coupled to the exciter piston 40, and an eccentric wheel 20. The eccentric wheel 20 is coupled to the connecting rod 30 on one side and is mounted so as to be rotatable with respect to the transmission housing 60 via an end plate 10 of the transmission housing 60 on the other side. The end plate 10 is integrated in the transmission housing 60. The eccentric wheel 20 is in the form of an externally toothed gear wheel, which can be driven in rotation via an electric motor (illustrated solely schematically as M).

According to the invention, the impact mechanism 70 has a bearing body 25 on which the eccentric wheel 20 is mounted rotatably by means of a pair of plain bearings 28. The bearing body 25 here is configured as a bearing shaft 26 which is different from the eccentric wheel 20. The bearing shaft 26 is composed by way of example of a carbon fiber-reinforced PEEK plastic which has been provided with polytetrafluoroethylene (PTFE) in order to improve the tribological properties. The eccentric wheel 20 has a central bore 22 which is paired with the bearing shaft 26 via a clearance fit SP, as a result of which the pair of plain bearings 28 is formed.

As can be gathered in particular also from FIG. 10 (excerpt of the bearing shaft from FIG. 1A), the bearing shaft 26 has a collar 27 which extends in the radial direction RR. The collar 27 provides an axial sliding surface AG for the eccentric wheel 20. The bearing shaft 26 here is secured by its collar 27 in a form-fitting manner against rotating relative to the transmission housing 60, more precisely relative to the end plate 10 of the transmission housing 60. The form fit is provided by a waved revolving toothing 27' on the collar 27. As can be gathered from FIG. 1A, the eccentric wheel 20 is directly in contact with the collar 27. The eccentric wheel 20 is secured by the collar 27 in the axial direction AR against lifting off from the connecting rod 30 (downward in FIG. 1A).

On a side of the collar 27 facing the eccentric wheel 20, the bearing shaft 26 is paired via a plate clearance fit SS with the transmission housing 60, more precisely with the end plate 10 of the transmission housing 60. A screw connection 11 secures the bearing shaft 26 in the axial direction AR in the transmission housing 60.

Finally, the transmission housing 60 has a closure cover 65 which, on a side facing the eccentric wheel 20, has four retaining lips 67, the profiles of which—directly or concentrically—follow a circular path 23 of an eccentric point 21 of the eccentric wheel 20. In this way, the connecting rod 30 and the eccentric wheel 20 are secured against lifting off in the axial direction AR (upward in FIG. 1A).

A separating cap 71 that is arranged between the main shell 61 and the cover shell 65 and engages around at least the eccentric wheel 20 is optionally provided.

Figure 2:
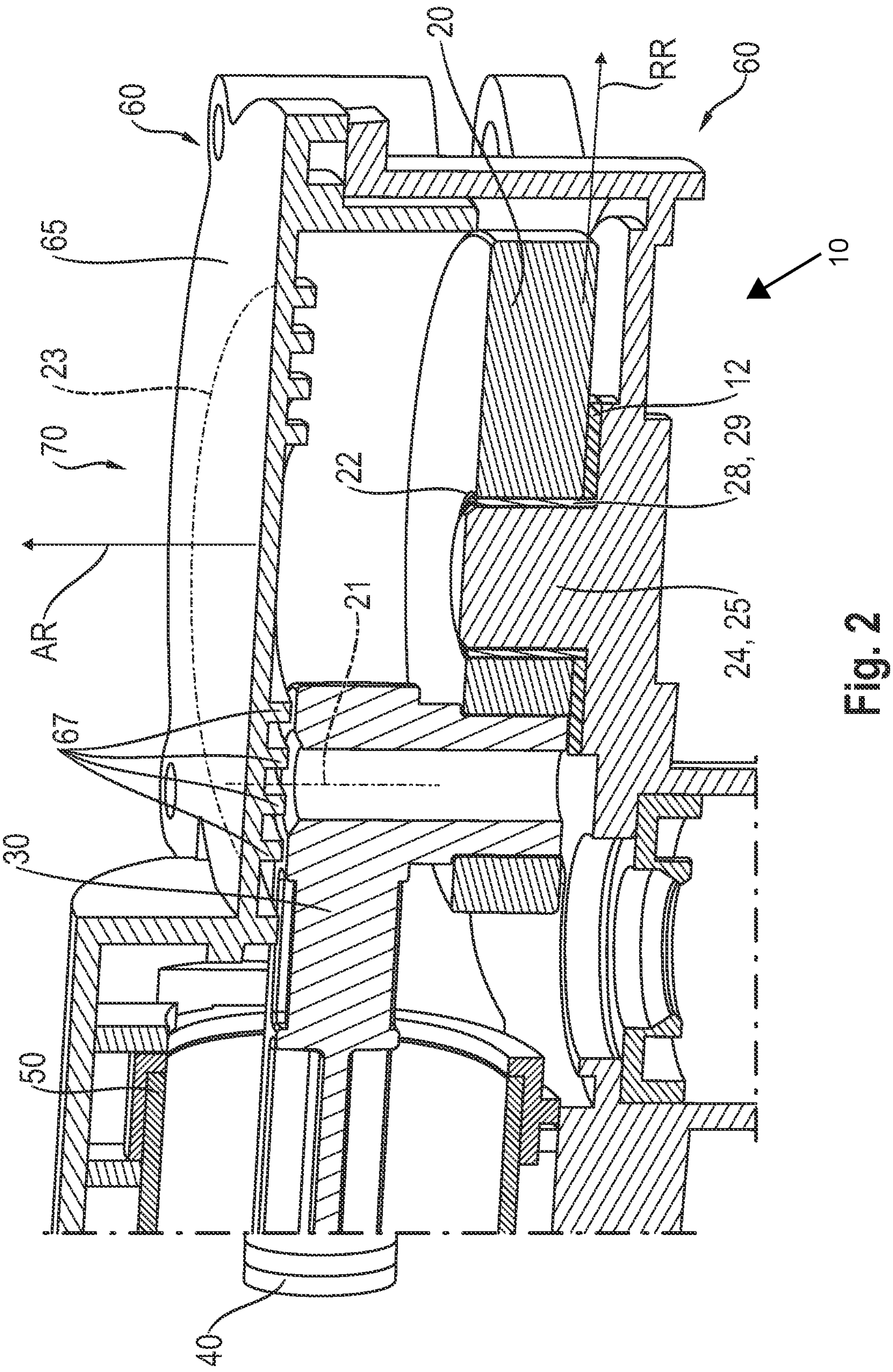
FIG. 2 shows a second exemplary embodiment of an impact mechanism according to the invention.

A second preferred exemplary embodiment of an electropneumatic impact mechanism 70 of an electric hand-held power tool 100 (cf. FIG. 1B, for example in the form of a chipping hammer) is illustrated in FIG. 2.

The electropneumatic impact mechanism 70 likewise has a transmission housing 60 and a guide tube 50, wherein the guide tube 50 is arranged at least partially in the transmission housing 60. The electropneumatic impact mechanism 70 also has an exciter piston 40 that is movable in the guide tube 50, a connecting rod 30 coupled to the exciter piston 40, and an eccentric wheel 20. The eccentric wheel 20 is coupled to the connecting rod 30 on one side and is mounted so as to be rotatable with respect to the transmission housing 60 via an end plate 10 of the transmission housing 60 on the other side. The end plate 10 is integrated in the transmission housing 60. The eccentric wheel 20 is in the form of an externally toothed gear wheel, which can be rotationally driven via an electric motor of the hand-held power tool 100.

Figure 1C:
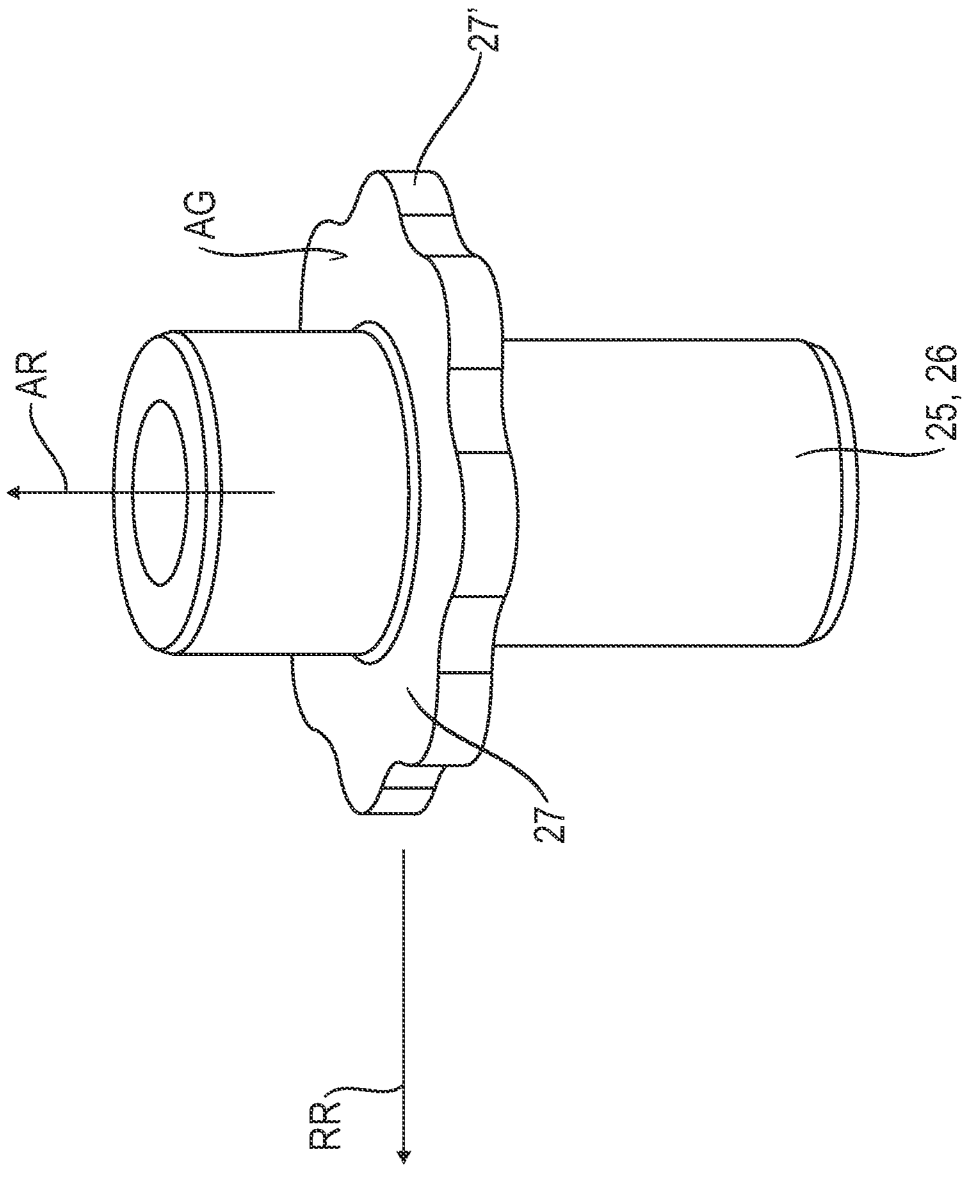

In contrast to the exemplary embodiment of FIG. 1, in which the bearing body 25 is configured as a bearing shaft 26 which is different from the eccentric wheel 20, in the case of the impact mechanism 70 of FIG. 2 the bearing body 25 is configured as a bearing journal 24 integral with the transmission housing 60. A pair of plain bearings 28 located between eccentric wheel 20 and bearing journal 24 has a plain bearing bushing 29. The plain bearing bushing 29 is pressed into a central bore 22 of the eccentric wheel 20. In order to improve the sliding properties between the end plate 10 and the eccentric wheel 20, a PTFE sliding coating 12 is provided between the end plate 10 and the eccentric wheel 20.

The transmission housing 60 likewise has a closure cover 65 which, on a side facing the eccentric wheel 20, has a retaining lip 67, the profile of which follows a circular path 23 of an eccentric point 21 of the eccentric wheel 20. By way of example, three further concentric retaining lips 67 are provided. In this way, the connecting rod 30 and the eccentric wheel 20 are secured against lifting off in the axial direction AR (upward in FIG. 2).

LIST OF REFERENCE SIGNS

10 End plate
11 Screw connection
12 Sliding coating
20 Eccentric wheel
21 Eccentric point
22 Central bore
23 Circular path
24 Bearing journal
25 Bearing body
26 Bearing shaft
27 Collar
27' Revolving toothing
28 Pair of plain bearings
29 Plain bearing bushing
30 Connecting rod
40 Exciter piston
50 Guide tube
60 Transmission housing
65 Closure cover
67 Retaining lip
70 Impact mechanism
71 Separating cap
100 Electric hand-held power tool
AG Axial sliding surface
AR Axial direction
RR Radial direction
SP Clearance fit
SS Plate clearance fit

What is claimed is:

1. An electropneumatic impact mechanism for an electric hand-held power tool, the impact mechanism comprising:

a transmission housing;

a guide tube arranged at least partially in the transmission housing;

an exciter piston movable in the guide tube;

a connecting rod coupled to the exciter piston;

an eccentric wheel coupled to the connecting rod on one side and mounted so as to be rotatable with respect to the transmission housing on the other side; and a bearing body, the eccentric wheel being mounted rotatably on the bearing body via a pair of plain bearings; wherein the bearing body is configured as a bearing shaft different from the eccentric wheel and the bearing shaft has a collar providing an axial sliding surface for the eccentric wheel.

2. The impact mechanism as recited in claim 1 wherein the bearing shaft is composed of plastic.

3. The impact mechanism as recited in claim 2 wherein the plastic is a carbon fiber-reinforced plastic.

4. The impact mechanism as recited in claim 1 wherein the eccentric wheel has a central bore paired with the bearing shaft via a clearance fit to define the pair of plain bearings.

5. The impact mechanism as recited in claim 1 wherein the bearing shaft is secured by the collar in a form-fitting manner against rotating relative to the transmission housing.

6. The impact mechanism as recited in claim 1 wherein the eccentric wheel is directly in contact with the collar.

7. The impact mechanism as recited in claim 6 wherein the eccentric wheel is secured by the collar in the axial direction against lifting off from the connecting rod.

8. The impact mechanism as recited in claim 1 wherein the eccentric wheel is secured by the collar in the axial direction against lifting off from the connecting rod.

9. The impact mechanism as recited in claim 1 wherein the bearing shaft is paired with the transmission housing via a clearance fit on a side of the collar facing the eccentric wheel.

10. The impact mechanism as recited in claim 9 wherein the bearing shaft is is secured by a screw connection in an axial direction in the transmission housing.

11. The impact mechanism as recited in claim 1 wherein the bearing shaft is is secured by a screw connection in an axial direction in the transmission housing.

12. The impact mechanism recited in claim 1 wherein the transmission housing has a closure cover having, on a side facing the eccentric wheel, a retaining lip, a profile of the retaining lip at least partially following a circular path of an eccentric point of the eccentric wheel.

13. The impact mechanism as recited in claim 1 wherein the eccentric wheel is configured as an externally toothed gear wheel.

14. An electric hand-held power tool comprising the impact mechanism as recited in claim 1.

15. The power tool as recited in claim 14 further comprising an electric motor and wherein the eccentric wheel is an externally toothed gear wheel driven by the electric motor.

16. The power tool as recited in claim 14 wherein the power tool is a hammer drill or chipping hammer.

17. An electropneumatic impact mechanism for an electric hand-held power tool, the impact mechanism comprising:

a transmission housing;

a guide tube arranged at least partially in the transmission housing;

an exciter piston movable in the guide tube;

a connecting rod coupled to the exciter piston;

an eccentric wheel coupled to the connecting rod on one side and mounted so as to be rotatable with respect to the transmission housing on the other side; and a bearing body, the eccentric wheel being mounted rotatably on the bearing body via a pair of plain bearings; wherein the bearing body is configured as a bearing journal integrally with the transmission housing.

18. The impact mechanism as recited in claim 17 wherein the pair of plain bearings includes a plain bearing bushing arranged between the eccentric wheel and the bearing journal.

19. An electropneumatic impact mechanism for an electric hand-held power tool, the impact mechanism comprising:

a transmission housing;

a guide tube arranged at least partially in the transmission housing;

an exciter piston movable in the guide tube;

a connecting rod coupled to the exciter piston;

an eccentric wheel coupled to the connecting rod on one side and mounted so as to be rotatable with respect to the transmission housing on the other side; and a bearing body, the eccentric wheel being mounted rotatably on the bearing body via a pair of plain bearings, wherein the transmission housing has a closure cover having, on a side facing the eccentric wheel, a retaining lip, a profile of the retaining lip at least partially following a circular path of an eccentric point of the eccentric wheel.

* * * * *